US009204447B2

(12) United States Patent
Isu et al.

(10) Patent No.: US 9,204,447 B2
(45) Date of Patent: Dec. 1, 2015

(54) WIRELESS COMMUNICATION DEVICE WITH FREQUENCY CHANNEL SELECTING

(75) Inventors: Kumiko Isu, Tokyo (JP); Shu Murayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 7 days.

(21) Appl. No.: 14/002,810

(22) PCT Filed: May 24, 2012

(86) PCT No.: PCT/JP2012/003396
§ 371 (c)(1),
(2), (4) Date: Sep. 3, 2013

(87) PCT Pub. No.: WO2012/169132
PCT Pub. Date: Dec. 13, 2012

(65) Prior Publication Data
US 2013/0344803 A1  Dec. 26, 2013

(30) Foreign Application Priority Data

Jun. 10, 2011  (JP) .................................. 2011-130336

(51) Int. Cl.
*H04W 72/00* (2009.01)
*H04W 72/04* (2009.01)
*H04W 36/32* (2009.01)
*H04W 24/02* (2009.01)
(Continued)

(52) U.S. Cl.
CPC ............ *H04W 72/048* (2013.01); *H04W 36/32* (2013.01); *G01S 13/931* (2013.01);
(Continued)

(58) Field of Classification Search
CPC .................. H04B 1/7097; H04B 2201/70792; H04W 24/02; H04W 28/0226; H04W 28/0236; G01S 13/931; G01S 2013/936

USPC .............. 455/296, 450, 451, 452.1, 436, 441, 455/443, 444, 41.2
See application file for complete search history.

(56) References Cited

U.S. PATENT DOCUMENTS 5,666,655 A * 9/1997 Ishikawa et al. .............. 455/512
5,898,926 A * 4/1999 Konishi ........................ 455/441
(Continued)

FOREIGN PATENT DOCUMENTS

| JP | 2009 48546 | 3/2009 |
| JP | 2010 68351 | 3/2010 |
| JP | 2010 81179 | 4/2010 |

OTHER PUBLICATIONS

International Search Report Issued Jun. 19, 2012 in PCT/JP12/03396 Filed May 24, 2012.

*Primary Examiner* — Duc M Nguyen
(74) *Attorney, Agent, or Firm* — Oblon, McClelland, Maier & Neustadt, L.L.P.

(57) ABSTRACT

There are provided a wireless communicator that performs channel scanning, in a period during which wireless communication is not performed, to detect a frequency channel currently used by a surrounding wireless communication device; a frequency channel information storage that stores frequency channel information indicating the frequency channel detected by the wireless communicator; and a travel information acquisition unit that acquires travel information indicating motion of a vehicle. A switch controller performs switching control of a frequency channel used by the wireless communicator in accordance with the frequency channel information and the travel information acquired by the travel information acquisition unit.

13 Claims, 10 Drawing Sheets

(51) Int. Cl.
  *G01S 13/93* (2006.01)
  *H04L 29/08* (2006.01)
  *H04W 4/04* (2009.01)
  *H04W 72/02* (2009.01)

(52) U.S. Cl.
  CPC ........... *G01S2013/936* (2013.01); *H04L 67/12* (2013.01); *H04W 4/046* (2013.01); *H04W 24/02* (2013.01); *H04W 72/02* (2013.01)

(56) References Cited

U.S. PATENT DOCUMENTS

| | | | |
|---|---|---|---|
| 5,956,644 A * | 9/1999 | Miller et al. | 455/453 |
| 6,128,327 A * | 10/2000 | Bird et al. | 375/132 |
| 6,256,500 B1 * | 7/2001 | Yamashita | 455/441 |
| 7,099,673 B2 * | 8/2006 | Yamashita | 455/452.2 |
| 7,558,575 B2 * | 7/2009 | Losh et al. | 455/441 |
| 7,561,846 B2 * | 7/2009 | Kellum | 455/41.2 |
| 8,041,325 B2 * | 10/2011 | Jonsson et al. | 455/296 |
| 2002/0165645 A1 * | 11/2002 | Kageyama | 701/1 |
| 2004/0005897 A1 * | 1/2004 | Tomoe et al. | 455/450 |
| 2005/0020203 A1 * | 1/2005 | Losh et al. | 455/11.1 |
| 2005/0075110 A1 * | 4/2005 | Posti et al. | 455/452.1 |
| 2008/0268768 A1 * | 10/2008 | Brown et al. | 455/1 |
| 2008/0268769 A1 * | 10/2008 | Brown et al. | 455/1 |
| 2011/0028163 A1 * | 2/2011 | Hoshihara et al. | 455/456.1 |
| 2014/0220985 A1 * | 8/2014 | Lin | 455/444 |

* cited by examiner

WIRELESS COMMUNICATION DEVICE WITH FREQUENCY CHANNEL SELECTING

TECHNICAL FIELD

The present invention relates to a wireless communication device that is installed in a moving object such as a vehicle, and that selects an arbitrary frequency channel from among a plurality of frequency channels and performs wireless communication by using the frequency channel.

BACKGROUND ART

When wireless communication is performed between a plurality of wireless communication devices installed in different vehicles, in order to avoid the occurrence of interference with other wireless communications, switching control of frequency channel is performed. In the switching control, channel scanning is performed to detect frequency channels currently used by surrounding wireless communication devices, and a frequency channel used for wireless communication is changed to an unused channel.

A method of appropriately changing a frequency channel in wireless communication in a vehicle according to communication conditions is disclosed in, for example, the following Patent Document 1.

In the disclosed method, quality of image data is measured as a characteristic of a currently used frequency channel, and the measurement period is changed according to the moving speed of a vehicle. Specifically, the change is made such that the longer measurement period is set as the moving speed of the vehicle is getting higher.

By changing the measurement period according to the moving speed of the vehicle, measurement accuracy can be improved. It enables the wireless communication to perform frequency channel switching depending on communication conditions.

CITATION LIST

Patent Literature 1: JP 2010-068351 A (Paragraph [0037] and FIG. 7)

SUMMARY OF INVENTION

Since the conventional wireless communication device is configured in the above-described manner, by changing the measurement period of the quality of image data according to the moving speed of the vehicle, the frequency channel is appropriately changed. However, since the frequency channel is changed when the quality of image data has deteriorated, communication conditions have already deteriorated at the time of changing the frequency channel. Therefore, there is a problem that the influence on communication is great.

In addition, although the measurement period of the quality of image data is changed according to the moving speed of the vehicle, the timing at which the frequency channel is changed is unrelated to the moving speed of the vehicle. Therefore, there is a problem that the frequency channel is frequently changed even in the state where the wireless communication is influenced by interference in a short time (i.e. the state where the vehicle is traveling at high speed).

The invention is made to solve problems such as those described above, and an object of the present invention is to provide a wireless communication device which is capable of suppressing the excessive channel switching without causing an increase in the influence of interference on wireless communication.

A wireless communication device according to the present invention includes: a wireless communicator that performs wireless communication with another wireless communication device using a frequency channel, while performing channel scanning to detect a frequency channel currently used by a surrounding wireless communication device, the channel scanning being performed in a period during which the wireless communication is not performed; a frequency channel information storage that stores frequency channel information indicating the frequency channel detected by the wireless communicator; a travel information acquisition unit that acquires travel information indicating motion of a moving object in which the wireless communication device is installed; and a switch controller that performs switching control of the frequency channel used by the wireless communicator in accordance with to the frequency channel information stored in the frequency channel information storage and the travel information acquired by the travel information acquisition unit.

According to the invention, the configuration is such that there are provided: a wireless communicator that performs wireless communication with another wireless communication device using a frequency channel, while performing channel scanning to detect a frequency channel currently used by a surrounding wireless communication device, the channel scanning being performed in a period during which the wireless communication is not performed; a frequency channel information storage that stores frequency channel information indicating the frequency channel detected by the wireless communicator; a travel information acquisition unit that acquires travel information indicating motion of a moving object in which the wireless communication device is installed; and a switch controller that performs switching control of the frequency channel used by the wireless communicator in accordance with to the frequency channel information stored in the frequency channel information storage and the travel information acquired by the travel information acquisition unit. Therefore, there is an effect of being able to suppress excessive channel switching without causing an increase in the influence of interference on wireless communication.

DESCRIPTION OF EMBODIMENTS

Embodiment 1

Figure 1:
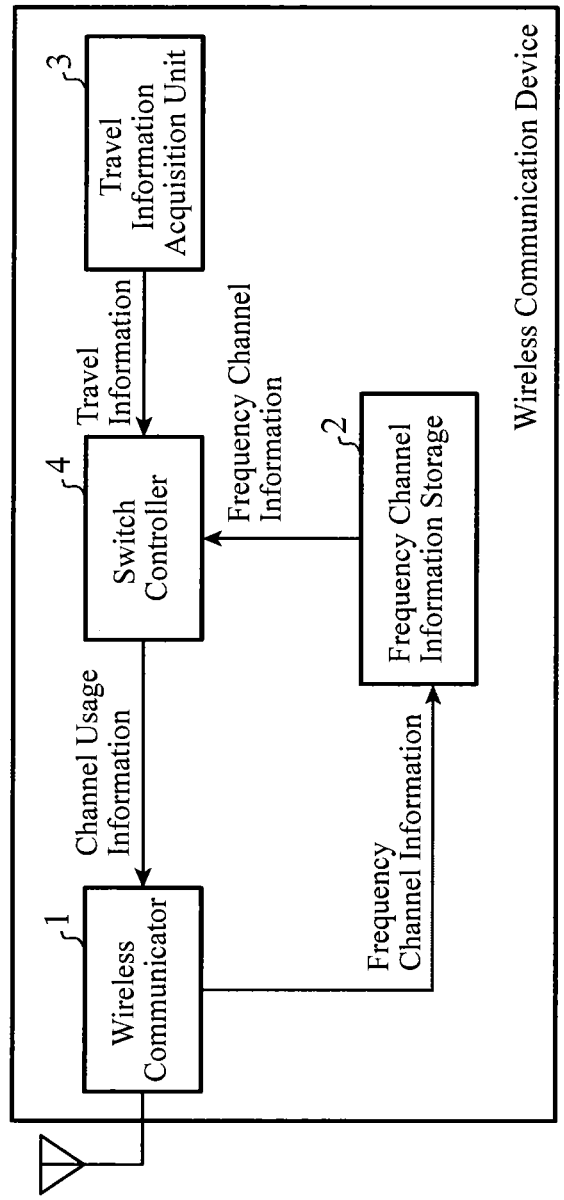
FIG. 1 is a configuration diagram showing a wireless communication device according to Embodiment 1 of the present invention.

FIG. 1 is a configuration diagram showing a wireless communication device according to Embodiment 1 of the present invention.

The wireless communication device of FIG. 1 is a device that is installed in a vehicle and that selects an arbitrary frequency channel from among a plurality of frequency channels and performs wireless communication with another wireless communication device installed in another vehicle by using the frequency channel.

In FIG. 1, a wireless communicator 1 is composed of, for example, a communication device in which a modulator, a demodulator, etc. are mounted. The wireless communicator 1 performs the process of performing wireless communication with another wireless communication device by using a frequency channel given by a switch controller 4. The wireless communicator 1 performs channel scanning in a period during which the wireless communication is not performed. The channel scanning is performed to detect frequency channels currently used by surrounding wireless communication devices.

A frequency channel information storage 2 is composed of, for example, a storage device such as a RAM or a hard disk, and stores frequency channel information indicating the frequency channels detected by the wireless communicator 1.

Note that the frequency channel information includes not only information indicating the frequency channels detected by the wireless communicator 1, but also information indicating the received signal strengths of the frequency channels.

A travel information acquisition unit 3 is composed of, for example, a semiconductor integrated circuit on which a CPU is mounted, a one-chip microcomputer, or the like. The travel information acquisition unit 3 performs the process of acquiring a vehicle travel speed, etc., as travel information indicating the motion of the vehicle in which the wireless communication device is installed.

The switch controller 4 is composed of, for example, a semiconductor integrated circuit on which a CPU is mounted, a one-chip microcomputer, or the like. The switch controller 4 performs switching control of the frequency channel used by the wireless communicator 1 in accordance with the frequency channel information stored in the frequency channel information storage 2 and the travel information acquired by the travel information acquisition unit 3.

Specifically, when a vehicle travel speed V acquired by the travel information acquisition unit 3 is equal to or more than a predetermined speed threshold $V_{th}$, the switch controller 4 does not perform the switching control of the frequency channel used by the wireless communicator 1. On the other hand, when the travel speed V is less than the speed threshold $V_{th}$, the switch controller 4 performs the switching control to select a frequency channel to be used by the wireless communicator 1 and gives the selected frequency channel to the wireless communicator 1.

In the example represented by FIG. 1, it is assumed that the wireless communicator 1, the frequency channel information storage 2, the travel information acquisition unit 3, and the switch controller 4, which are the components of the wireless communication device is composed of dedicated hardware. Alternatively, a part of those components or the whole ones may be composed of a computer.

When the entire wireless communication device is composed of a computer, a program in which the processing content of the wireless communicator 1, the frequency channel information storage 2, the travel information acquisition unit 3, and the switch controller 4 is written may be stored in a memory of the computer, and thus a CPU of the computer may implement the stored program in the memory.

In addition, when a part of the wireless communication device (e.g., the switch controller 4) is composed of a computer, a program in which the process content of the switch controller 4 is written may be stored in a memory of the computer, and a CPU of the computer may implement the stored program in the memory.

Figure 2:
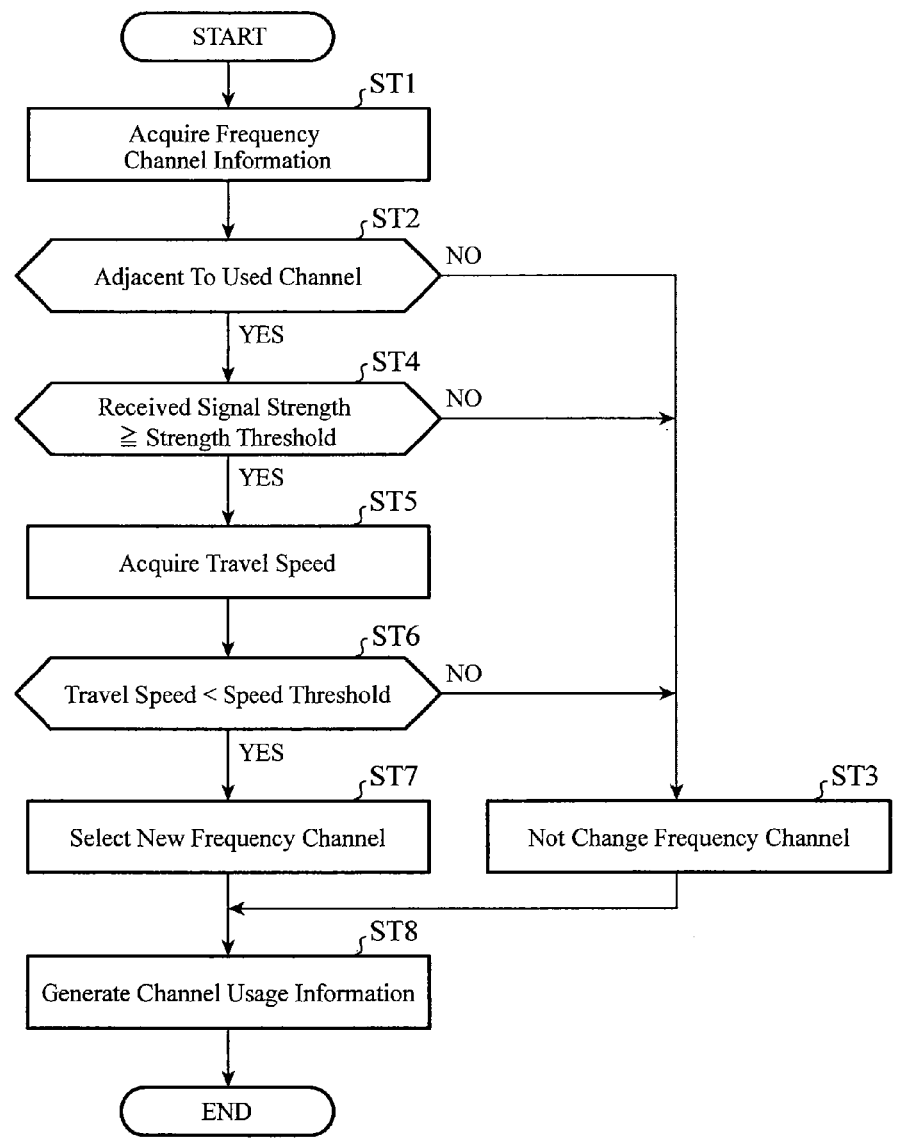
FIG. 2 is a flowchart showing the processing content of a switch controller 4 of the wireless communication device according to Embodiment 1 of the present invention.

FIG. 2 is a flowchart showing the processing content of the switch controller 4 of the wireless communication device according to Embodiment 1 of the present invention.

The operation will be described.

The wireless communicator 1 performs wireless communication with another wireless communication device by using a frequency channel given by the switch controller 4 which will be described later.

In addition, the wireless communicator 1 performs channel scanning in a period during which the wireless communication is not performed in order to detect frequency channels currently used by surrounding wireless communication devices.

On detecting a frequency channel currently used by a surrounding wireless communication device, the wireless communicator 1 measures a received signal strength S of the detected frequency channel. The wireless communicator 1 outputs frequency channel information including information on the frequency channel and the received signal strengths S to the frequency channel information storage 2.

The frequency channel information storage 2 stores the frequency channel information output from the wireless communicator 1.

The travel information acquisition unit 3 acquires, for example, a vehicle travel speed V as travel information indicating motion of the vehicle from a speedometer of the vehicle in which the wireless communication device is installed.

The switch controller 4 acquires the frequency channel information stored in the frequency channel information storage 2 (step ST1).

After acquiring the frequency channel information, the switch controller 4 recognizes the frequency channels currently used by the surrounding wireless communication devices by referring to the frequency channel information, and determines whether the frequency channels include the same channel as or an adjacent channel to the frequency channel currently used by the wireless communicator 1 (step ST2).

If the frequency channels currently used by the surrounding wireless communication devices do not include the same or adjacent channel as/to the frequency channel currently used by the wireless communicator 1, the switch controller 4 does not change the frequency channel currently used by the wireless communicator 1 because the communication is not influenced by interference (step ST3).

On the other hand, if the frequency channels currently used by the surrounding wireless communication devices include the same or adjacent channel as/to the frequency channel currently used by the wireless communicator 1, the switch controller 4 recognizes the received signal strengths S of the frequency channels currently used by the surrounding wireless communication devices by referring to the frequency channel information because the communication may be influenced by interference. Then the switch controller 4 determines whether the received signal strengths S of the frequency channels are equal to or more than a predetermined strength threshold $S_{th}$ (step ST4).

If the received signal strengths S of the frequency channels currently used by the surrounding wireless communication devices are less than the strength threshold $S_{th}$, the switch controller 4 does not change the frequency channel currently used by the wireless communicator 1 (step ST3). This is because it is less likely that the communication is influenced by interference (even if the communication is influenced by interference, the influence is considered to be small).

On the other hand, if the received signal strengths S of the frequency channels currently used by the surrounding wireless communication devices are equal to or more than the strength threshold $S_{th}$, the switch controller 4 acquires the vehicle travel speed V from the travel information acquisition unit 3 (step ST5). This is because it is highly likely that the communication is influenced by interference.

After acquiring the vehicle travel speed V from the travel information acquisition unit 3, the switch controller 4 determines whether the vehicle travel speed V is equal to or more than a predetermined speed threshold $V_{th}$ (step ST6).

If the vehicle travel speed V is equal to or more than the predetermined speed threshold $V_{th}$, the switch controller 4 does not change the frequency channel currently used by the wireless communicator 1 (step ST3). This is because it is considered that the time required for the vehicle to get away from a location where the communication is interfered is short, and thus the period of time during which the communication is influenced by the interference is short.

On the other hand, if the vehicle travel speed V is less than the predetermined speed threshold $V_{th}$, the switch controller 4 changes the frequency channel currently used by the wireless communicator 1. This is because it is considered that the time required for the vehicle to get away from a location where the communication is interfered is long and thus the period of time during which the communication is influenced by the interference is long.

Specifically, the switch controller 4 selects any one frequency channel from among usable frequency channels other than the frequency channels included in the frequency channel information stored in the frequency channel information storage 2 (step ST7).

When the switch controller 4 changes the frequency channel currently used by the wireless communicator 1, the switch controller 4 outputs channel usage information indicating the newly selected frequency channel to the wireless communicator 1. When the switch controller 4 does not change the frequency channel currently used by the wireless communicator 1, the switch controller 4 outputs channel usage information indicating the same channel as the currently used frequency channel to the wireless communicator 1 (step ST8).

Thereafter, the wireless communicator 1 performs wireless communication with another wireless communication device, using the frequency channel indicated by the channel usage information output from the switch controller 4.

As is clear from the above explanation, according to Embodiment 1, the configuration is such that there are provided the wireless communicator 1 that performs wireless communication with another wireless communication device by using a frequency channel and, on the other hand, performs channel scanning in a period during which the wireless communication is not performed to detect frequency channels currently used by surrounding wireless communication devices; the frequency channel information storage 2 that stores frequency channel information indicating the frequency channels detected by the wireless communicator 1; and the travel information acquisition unit 3 that acquires travel information indicating the motion of a vehicle in which the wireless communication device is installed, and the switch controller 4 performs switching control of the frequency channel used by the wireless communicator 1 in accordance with the frequency channel information stored in the frequency channel information storage 2 and the travel information acquired by the travel information acquisition unit 3. Therefore, there is an effect of being able to suppress excessive channel switching without causing an increase in the influence of interference on the communication.

Specifically, the switch controller 4 is configured not to perform switching control of the frequency channel used by the wireless communicator 1 when a vehicle travel speed V acquired by the travel information acquisition unit 3 is equal to or more than a predetermined speed threshold $V_{th}$, and to perform switching control of the frequency channel used by the wireless communicator 1 only when the travel speed V is less than the speed threshold $V_{th}$. Since the frequency channel switching is not performed under the state where the period of time during which the communication is influenced by interference is short (i.e. when the vehicle travels at high speed), the excessive channel switching can be suppressed.

Embodiment 2

Figure 3:
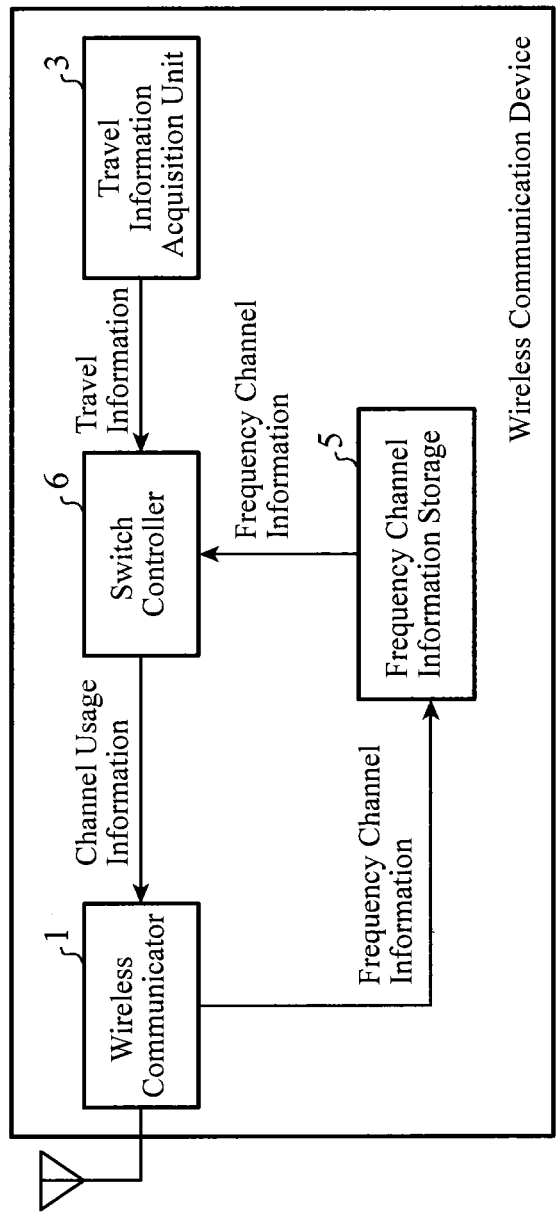
FIG. 3 is a configuration diagram showing a wireless communication device according to Embodiment 2 of the present invention.

FIG. 3 is a configuration diagram showing a wireless communication device according to Embodiment 2 of the present invention. In the drawing, the same reference numerals as those in FIG. 1 indicate the same or corresponding portions, and thus description thereof are omitted.

A frequency channel information storage 5 is composed of, for example, a storage device such as a RAM or a hard disk, and stores frequency channel information output from a wireless communicator 1.

On storing the frequency channel information output from the wireless communicator 1, the frequency channel information storage 5 records the number C of detection of the frequency channels performed by the wireless communicator 1.

The switch controller 4 is composed of, for example, a semiconductor integrated circuit on which a CPU is mounted, a one-chip microcomputer, or the like. The switch controller 4 performs switching control of the frequency channel used by the wireless communicator 1 in accordance with the frequency channel information stored in the frequency channel information storage 5 and the travel information acquired by the travel information acquisition unit 3.

Specifically, on changing the frequency channel used by the wireless communicator 1, the switch controller 6 sets a higher interference detection threshold $C_{th}$ for a higher vehicle travel speed V acquired by the travel information acquisition unit 3. The switch controller 6 excludes, from selection, a frequency channel whose number C of detection recorded in the frequency channel information storage 5 exceeds the interference detection threshold $C_{th}$, and selects a frequency channel to be used by the wireless communicator 1 from among usable frequency channels other than the excluded frequency channels.

In the example represented by FIG. 3, it is assumed that the wireless communicator 1, the frequency channel information storage 5, the travel information acquisition unit 3, and the switch controller 6, which are the components of the wireless communication device is composed of dedicated hardware. Alternatively, a part of those components or the whole ones may be composed of a computer.

When the entire wireless communication device is composed of a computer, a program in which the processing content of the wireless communicator 1, the frequency channel information storage 5, the travel information acquisition unit 3, and the switch controller 6 is written may be stored in a memory of the computer, and thus a CPU of the computer may implement the stored program in the memory.

In addition, when a part of the wireless communication device (e.g., the switch controller 6) is composed of a computer, a program in which the process content of the switch controller 6 is written may be stored in a memory of the computer, and a CPU of the computer may implement the stored program in the memory.

Figure 4:
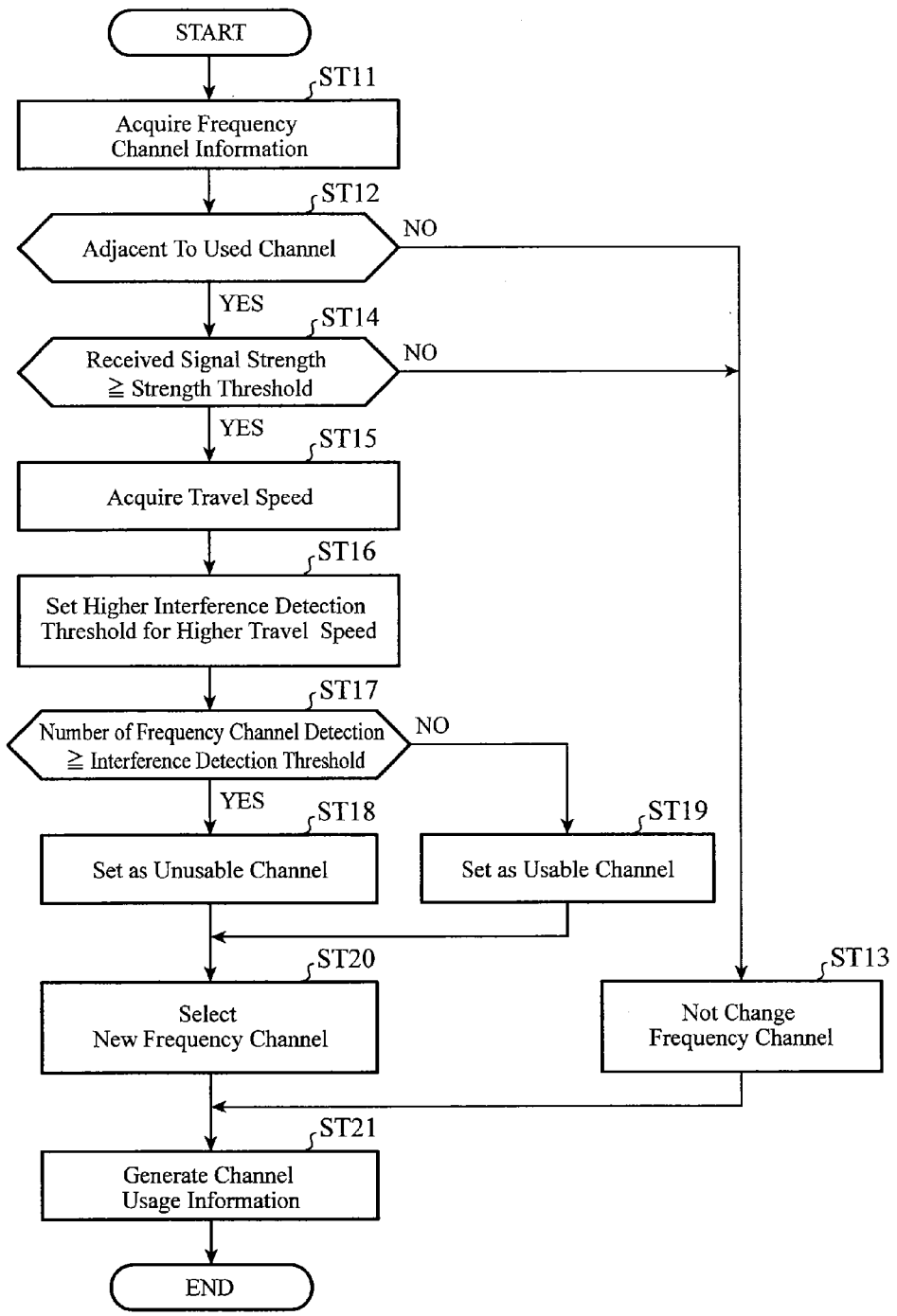
FIG. 4 is a flowchart showing the processing content of a switch controller 6 of the wireless communication device according to Embodiment 2 of the present invention.

FIG. 4 is a flowchart showing the processing content of the switch controller 6 of the wireless communication device according to Embodiment 2 of the present invention.

The operation will be described.

The wireless communicator 1 performs wireless communication with another wireless communication device by using a frequency channel given by the switch controller 6 which will be described later.

In addition, the wireless communicator 1 performs channel scanning in a period during which the wireless communication is not performed in order to detect frequency channels currently used by surrounding wireless communication devices.

On detecting a frequency channel currently used by a surrounding wireless communication device, the wireless communicator 1 measures a received signal strength S of the detected frequency channel. The wireless communicator 1 outputs frequency channel information including information on the frequency channel and the received signal strengths S to the frequency channel information storage 5.

The frequency channel information storage 5 stores the frequency channel information output from the wireless communicator 1.

On storing the frequency channel information output from the wireless communicator 1, the frequency channel information storage 5 records the number C of detection of the frequency channels performed by the wireless communicator 1.

When, for example, frequency channel CH1 and frequency channel CH2 are detected as frequency channels currently used by surrounding wireless communication devices, each of the recorded number C of detection of the frequency channels CH1 and CH2 is incremented.

Note that a value "0" is recorded as the number C of detection of a frequency channel that has not been detected even once by the wireless communicator 1 among one or more usable frequency channels.

The travel information acquisition unit 3 acquires, for example, a vehicle travel speed V as travel information indicating motion of the vehicle from a speedometer of the vehicle in which the wireless communication device is installed.

The switch controller 6 acquires the frequency channel information stored in the frequency channel information storage 5 (step ST11).

After acquiring the frequency channel information, the switch controller 6 recognizes the frequency channels currently used by the surrounding wireless communication devices by referring to the frequency channel information, and determines whether the frequency channels include the same channel as or an adjacent channel to the frequency channel currently used by the wireless communicator 1 (step ST12).

If the frequency channels currently used by the surrounding wireless communication devices do not include the same or adjacent channel as/to the frequency channel currently used by the wireless communicator 1, the switch controller 6 does not change the frequency channel currently used by the wireless communicator 1 because the communication is not influenced by interference (step ST13).

On the other hand, if the frequency channels currently used by the surrounding wireless communication devices include the same or adjacent channel as/to the frequency channel currently used by the wireless communicator 1, the switch controller 6 recognizes the received signal strengths S of the frequency channels currently used by the surrounding wireless communication devices by referring to the frequency channel information because the communication may be influenced by interference. Then the switch controller 6 determines whether the received signal strengths S of the frequency channels are equal to or more than a predetermined strength threshold $S_{th}$ (step ST14).

If the received signal strengths S of the frequency channels currently used by the surrounding wireless communication devices are less than the strength threshold $S_{th}$, the switch controller 6 does not change the frequency channel currently used by the wireless communicator 1 (step ST13). This is because it is less likely that the communication is influenced by interference (even if the communication is influenced by interference, the influence is considered to be small).

On the other hand, if the received signal strengths S of the frequency channels currently used by the surrounding wireless communication devices are equal to or more than the strength threshold $S_{th}$, the switch controller 6 acquires the vehicle travel speed V from the travel information acquisition unit 3 (step ST15). This is because it is highly likely that the communication is influenced by interference.

After acquiring the vehicle travel speed V from the travel information acquisition unit 3, the switch controller 6 sets a higher interference detection threshold $C_{th}$ for a higher vehicle travel speed V (step ST16).

As the vehicle travel speed V is higher, the vehicle can speedily go through a location where wireless communication is interfered, and thereby comes off with a shorter time period of interference. For this reason, a higher interference detection threshold $C_{th}$ is set for a higher travel speed V.

After setting the interference detection threshold $C_{th}$, the switch controller 6 compares the number C of detection of each frequency channel (one or more usable frequency channels) recorded in the frequency channel information storage 5 with the interference detection threshold $C_{th}$ (step ST17). The switch controller 6 determines that the frequency channel whose number C is equal to or more than the interference detection threshold $C_{th}$ is a frequency channel that are highly likely to interfere the communication, and sets this frequency channel as a unusable channel (step ST18).

On the other hand, the frequency channel whose number C is less than the interference detection threshold $C_{th}$ is set as a usable channel (step ST19).

The switch controller 6 selects any one frequency channel from among the frequency channels set as the usable channels (i.e. frequency channels which are not set as the unusable channels) (step ST20).

When the switch controller 6 changes the frequency channel currently used by the wireless communicator 1 (i.e. when the frequency channels currently used by the surrounding wireless communication devices include the same or adjacent channel as/to the frequency channel currently used by the wireless communicator 1 and the received signal strengths S of the frequency channels currently used by the surrounding wireless communication devices are equal to or more than the strength threshold $S_{th}$), the switch controller 6 outputs channel usage information indicating the newly selected frequency channel to the wireless communicator 1. When the switch controller 6 does not change the frequency channel currently used by the wireless communicator 1, the switch controller 6 outputs channel usage information indicating the same channel as the currently used frequency channel to the wireless communicator 1 (step ST21).

Thereafter, the wireless communicator 1 performs wireless communication with another wireless communication device, using the frequency channel indicated by the channel usage information output from the switch controller 6.

As is clear from the above explanation, according to Embodiment 2, the configuration is such that when the frequency channel used by the wireless communicator 1 is changed, the switch controller 6 sets a higher interference detection threshold $C_{th}$ for a higher vehicle travel speed V acquired by the travel information acquisition unit 3, excludes from the selection the frequency channel whose number C of detection recorded in the frequency channel information storage 5 exceeds the interference detection threshold $C_{th}$, and selects a frequency channel to be used by the wireless communicator 1 from among the usable frequency channels other than the excluded frequency channels. Therefore, under the circumstances where the period of time during which communication is influenced by interference is short (i.e. where the vehicle travel speed is high), the frequency channel switching is not performed frequently, and thereby the advantage of being able to suppress excessive channel switching is achieved.

Embodiment 2 presents that a higher interference detection threshold $C_{th}$ is set for a higher vehicle travel speed V acquired by the travel information acquisition unit 3. Alternatively, a higher strength threshold $S_{th}$ can be set for the higher vehicle travel speed V acquired by the travel information acquisition unit 3.

In the case where the higher strength threshold $S_{th}$ is set for a higher vehicle travel speed V, and the vehicle travel speed V is high, a situation where the received signal strengths S of frequency channels currently used by surrounding wireless communication devices are equal to or more than the strength threshold $S_{th}$ decreases. As a result, the frequency channel switching is not performed frequently, and the advantage of being able to suppress excessive channel switching is achieved.

Embodiment 3

In the above-described Embodiment 1 presents that channel scanning is performed in a period during which wireless communication is not performed. Alternatively, the channel scanning may be performed when surrounding condition of the vehicle has changed.

Figure 5:
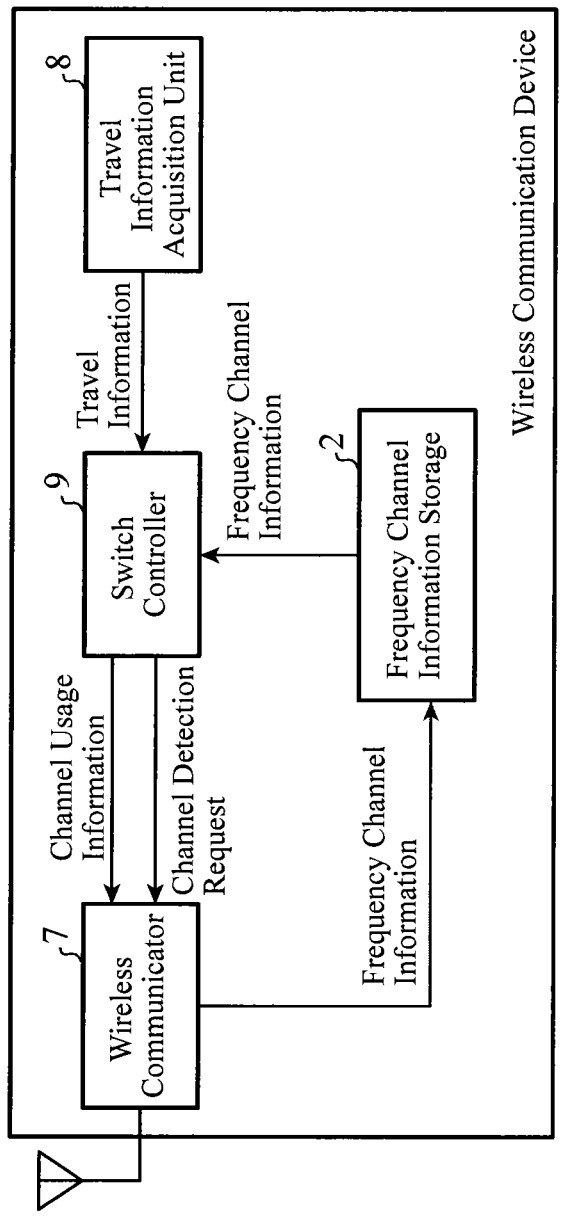
FIG. 5 is a configuration diagram showing a wireless communication device according to Embodiment 3 of the present invention.

FIG. 5 is a configuration diagram showing a wireless communication device according to Embodiment 3 of the present invention. In the drawing, the same reference numerals as those in FIG. 1 indicate the same or corresponding portions, and thus description thereof are omitted.

A wireless communicator 7 is composed of, for example, a communication device in which a modulator, a demodulator, etc. are mounted. The wireless communicator 7 performs the process of performing wireless communication with another wireless communication device by using a frequency channel given by a switch controller 9. The wireless communicator 7 performs channel scanning when receiving a channel detection request from the switch controller 9. The channel scanning is performed to detect frequency channels currently used by surrounding wireless communication devices.

A travel information acquisition unit 8 is composed of, for example, a semiconductor integrated circuit on which a CPU is mounted, a one-chip microcomputer, or the like. The travel information acquisition unit 3 performs the process of acquiring a vehicle travel speed, a vehicle travel location, vehicle acceleration/deceleration information, and steering wheel operation information etc., as travel information indicating the motion of the vehicle in which the wireless communication device is installed.

The switch controller 9 is composed of, for example, a semiconductor integrated circuit on which a CPU is mounted, a one-chip microcomputer, or the like. The switch controller 9 determines whether surrounding condition of the vehicle has changed by using the travel information acquired by the travel information acquisition unit 8. When the switch controller 9 determines that the surrounding condition has changed, the switch controller 9 outputs a channel detection request to the wireless communicator 7. The switch controller 9 performs switching control of the frequency channel used by the wireless communicator 7 by using frequency channel information stored in the frequency channel information storage 2.

In the example represented by FIG. 5, it is assumed that the wireless communicator 7, the frequency channel information storage 2, the travel information acquisition unit 8, and the switch controller 9, which are the components of the wireless communication device is composed of dedicated hardware. Alternatively, a part of those components or the whole ones may be composed of a computer.

When the entire wireless communication device is composed of a computer, a program in which the processing content of the wireless communicator 7, the frequency channel information storage 2, the travel information acquisition unit 8, and the switch controller 9 is written may be stored in a memory of the computer, and thus a CPU of the computer may implement the stored program in the memory.

In addition, when a part of the wireless communication device (e.g., the switch controller 9) is composed of a computer, a program in which the process content of the switch controller 9 is written may be stored in a memory of the computer, and a CPU of the computer may implement the stored program in the memory.

Figure 6:
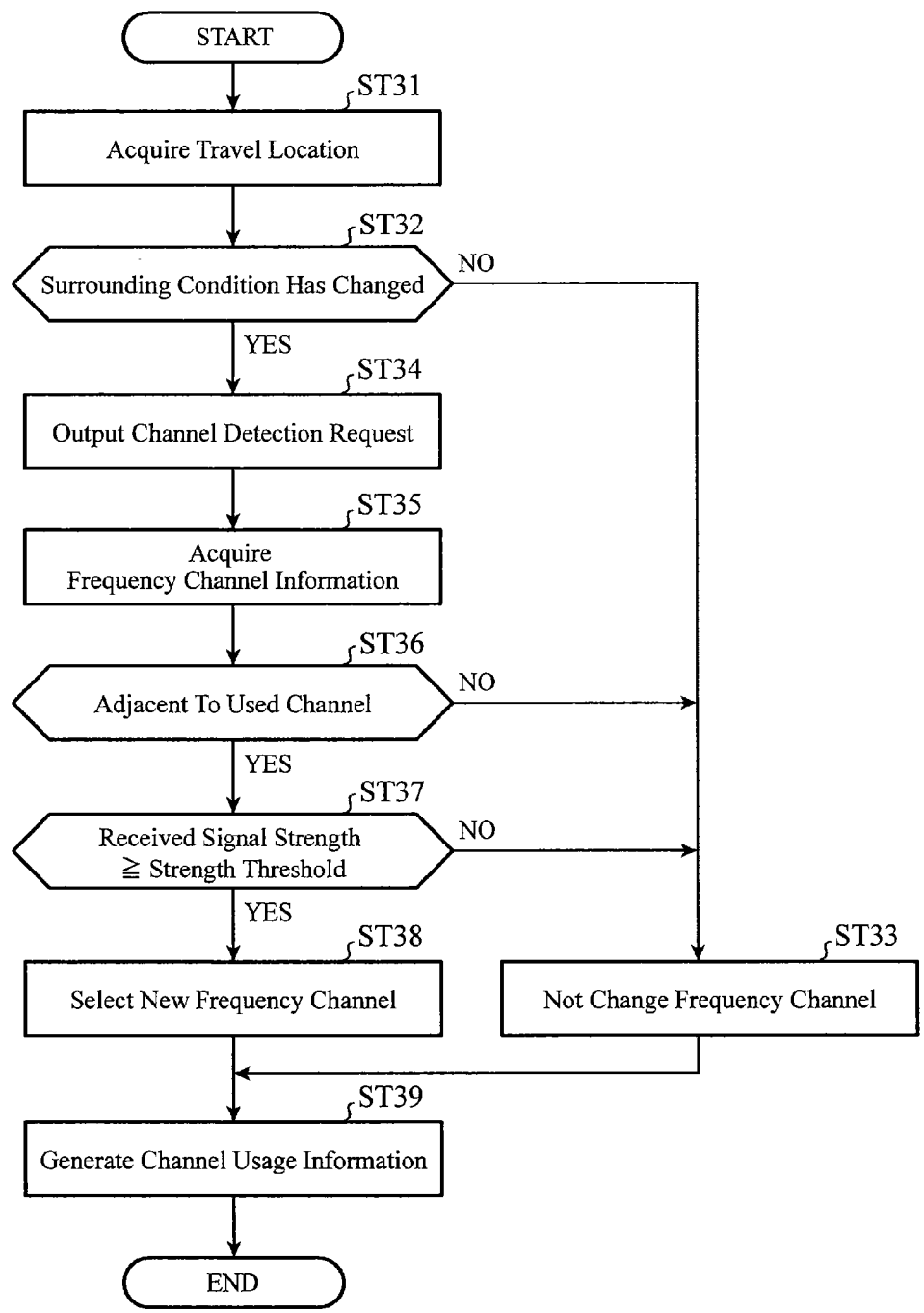
FIG. 6 is a flowchart showing the processing content of a switch controller 9 of the wireless communication device according to Embodiment 3 of the present invention.

FIG. 6 is a flowchart showing the processing content of the switch controller 9 of the wireless communication device according to Embodiment 3 of the present invention.

The operation will be described.

The wireless communicator 7 performs wireless communication with another wireless communication device by using a frequency channel given by the switch controller 9 which will be described later.

When the wireless communicator 7 receives a channel detection request from the switch controller 9, the wireless communicator 7 performs channel scanning in order to detect frequency channels currently used by surrounding wireless communication devices.

On detecting a frequency channel currently used by a surrounding wireless communication device, the wireless communicator 7 measures a received signal strength S of the detected frequency channel. The wireless communicator 7 outputs frequency channel information including information on the frequency channel and the received signal strengths S to the frequency channel information storage 2.

The frequency channel information storage 2 stores the frequency channel information output from the wireless communicator 7.

The travel information acquisition unit 8 acquires, for example, a vehicle travel speed V as travel information indicating motion of the vehicle from a speedometer of the vehicle in which the wireless communication device is installed.

The travel information acquisition unit 8 further acquires a vehicle travel location from a navigation device, in which the wireless communication device is installed, as travel information indicating the motion of the vehicle.

In addition to above, vehicle acceleration/deceleration information, steering wheel operation information, etc., are acquired.

The switch controller 9 acquires the vehicle travel location from the travel information acquisition unit 8 (step ST31).

After acquiring the vehicle travel location, the switch controller 9 compares the travel location with map information (e.g., map information stored in the navigation device), and determines whether the vehicle's surrounding condition has changed (step ST32).

When the vehicle is traveling on a straight road, the communication conditions do not change greatly because the relation with other vehicles traveling around the user's vehicle does not change greatly. However, after the user's vehicle passes an intersection or a fork, the communication conditions may change greatly. This is because there may be a situation where surrounding vehicles traveling in the same direction to the user's vehicle are no longer present or a situation where a vehicle which has not been present around the user's vehicle appears.

Hence, the switch controller 9 compares the vehicle travel location with the map information and determines that the vehicle's surrounding condition has changed when, for instance, the vehicle passes an intersection or a fork.

Although it is shown here that the switch controller 9 determines whether the vehicle's surrounding condition has changed by comparing the vehicle travel location with the map information, the switch controller 9 may determine that the vehicle surrounding condition has changed when a travel speed V which is vehicle travel information has changed or when acceleration or deceleration above a certain level is performed or when steering wheel operation has changed (e.g., steering wheel operation associated with lane change), or the like.

When a determination is made such that the vehicle's surrounding condition has not changed, the switch controller 9 does not change the frequency channel currently used by the wireless communicator 7 (step ST33). This is because it is highly likely that the communication conditions have not changed greatly.

On the other hand, when a determination is made such that the vehicle's surrounding condition has changed, the switch controller 9 outputs a channel detection request to the wireless communicator 7 because it is highly likely that the communication conditions have changed greatly (step ST34).

If the wireless communicator 7 is not performing wireless communication with another wireless communication device, the wireless communicator 7 performs channel scanning in response to the channel detection request output from the switch controller 9 to detect frequency channels currently used by surrounding wireless communication devices.

The frequency channel information storage 2 stores frequency channel information including information indicating the frequency channels detected by the wireless communicator 7 and received signal strengths S.

The switch controller 9 acquires the frequency channel information stored in the frequency channel information storage 2 (step ST35).

After acquiring the frequency channel information, the switch controller 9 recognizes the frequency channels currently used by the surrounding wireless communication devices by referring to the frequency channel information, and determines whether the frequency channels include the same channel as or an adjacent channel to the frequency channel currently used by the wireless communicator 7 (step ST36).

If the frequency channels currently used by the surrounding wireless communication devices do not include the same or adjacent channel as/to the frequency channel currently used by the wireless communicator 7, the switch controller 9 does not change the frequency channel currently used by the wireless communicator 7 because the communication is not influenced by interference (step ST33).

On the other hand, if the frequency channels currently used by the surrounding wireless communication devices include the same or adjacent channel as/to the frequency channel currently used by the wireless communicator 7, the switch controller 9 recognizes the received signal strengths S of the frequency channels currently used by the surrounding wireless communication devices by referring to the frequency channel information because the communication may be influenced by interference. Then the switch controller 9 determines whether the received signal strengths S of the frequency channels are equal to or more than a predetermined strength threshold $S_{th}$ (step ST37).

If the received signal strengths S of the frequency channels currently used by the surrounding wireless communication devices are less than the strength threshold $S_{th}$, the switch controller 9 does not change the frequency channel currently used by the wireless communicator 7 (step ST33). This is because it is less likely that the communication is influenced by interference (even if the communication is influenced by interference, the influence is considered to be small).

On the other hand, if the received signal strengths S of the frequency channels currently used by the surrounding wireless communication devices are equal to or more than the strength threshold $S_{th}$, the switch controller 9 changes the frequency channel currently used by the wireless communicator 7 because it is highly likely that the communication is influenced by interference.

Specifically, the switch controller 9 selects any one frequency channel from among usable frequency channels other than the frequency channels included in the frequency channel information stored in the frequency channel information storage 2 (step ST38).

When the switch controller 9 changes the frequency channel currently used by the wireless communicator 7 (i.e. when the frequency channels currently used by the surrounding wireless communication devices include the same or adjacent channel as/to the frequency channel currently used by the wireless communicator 7 and the received signal strengths S of the frequency channels currently used by the surrounding wireless communication devices are equal to or more than the strength threshold $S_{th}$), the switch controller 9 outputs channel usage information indicating the newly selected frequency channel to the wireless communicator 7. When the switch controller 9 does not change the frequency channel currently used by the wireless communicator 7, the switch controller 9 outputs channel usage information indicating the same channel as the currently used frequency channel to the wireless communicator 7 (step ST39).

Thereafter, the wireless communicator 7 performs wireless communication with another wireless communication device, using the frequency channel indicated by the channel usage information output from the switch controller 9.

As is clear from the above, according to Embodiment 3, the configuration is such that the switch controller 9 determines whether the vehicle's surrounding condition has changed based on travel information acquired by the travel information acquisition unit 8. If the switch controller 9 determines that the surrounding condition has changed, the switch controller 9 outputs a channel detection request to the wireless communicator 7. On the other hand, the switch controller 9 performs switching control of a frequency channel used by the wireless communicator 7 in accordance with frequency channel information stored in the frequency channel information storage 2. Therefore, under the circumstances where the communication conditions have not changed greatly (i.e. where the vehicle's surrounding condition has not changed), the frequency channel switching is not performed, and thereby the advantage of being able to suppress excessive channel switching is achieved.

Embodiment 3 presents that the frequency channel currently used by the wireless communicator 7 is changed when frequency channels currently used by surrounding wireless communication devices include the same or adjacent channel as/to the frequency channel currently used by the wireless communicator 7 and the received signal strengths S of the frequency channels currently used by the surrounding wireless communication devices are equal to or more than the strength threshold $S_{th}$. Alternatively, as in the above-described Embodiment 1, the frequency channel currently used by the wireless communicator 7 may be changed on a condition that a vehicle travel speed V is less than a speed threshold $V_{th}$.

Embodiment 4

In the above-described Embodiment 1 presents that a wireless communicator 1 performs channel scanning in a period during which wireless communication is not performed, and detects frequency channels currently used by surrounding wireless communication devices. Alternatively, only a specified frequency channel may be detected instead of all of the frequency channels currently used by the surrounding wireless communication devices.

Figure 7:
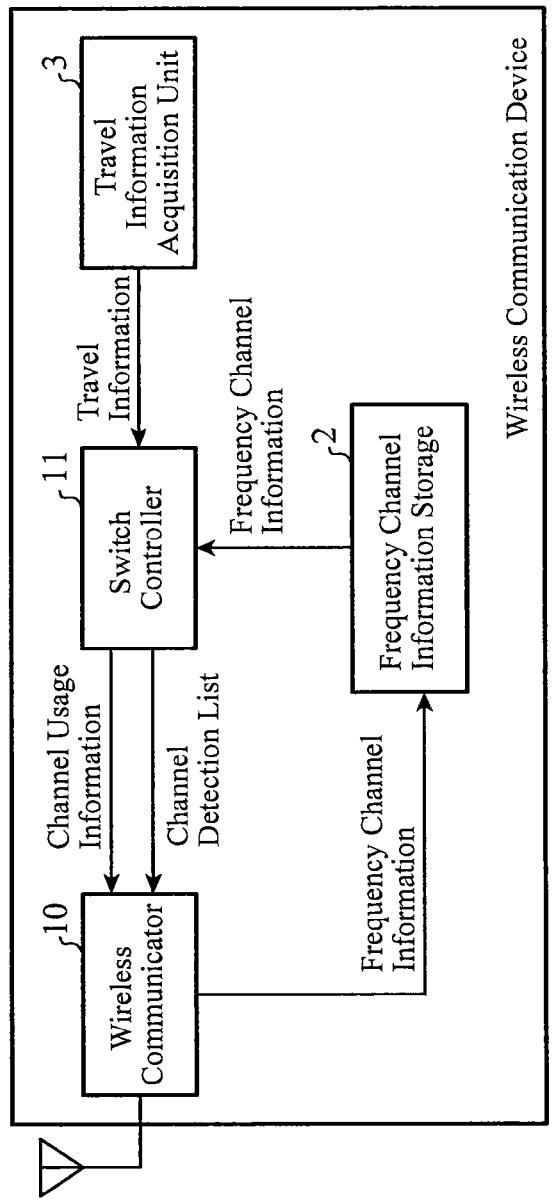
FIG. 7 is a configuration diagram showing a wireless communication device according to Embodiment 4 of the present invention.

FIG. 7 is a configuration diagram showing a wireless communication device according to Embodiment 4 of the present invention. In the drawing, the same reference numerals as those in FIG. 1 indicate the same or corresponding portions and thus description thereof are omitted.

A wireless communicator 10 is composed of, for example, a communication device in which a modulator, a demodulator, etc. are mounted. The wireless communicator 10 performs the process of performing wireless communication with another wireless communication device by using a frequency channel given by a switch controller 11. The wireless communicator 10 performs channel scanning in a period during which the wireless communication is not performed. The channel scanning is performed to detect frequency channels included in a channel detection list output from the switch controller 11.

The switch controller 11 is composed of, for example, a semiconductor integrated circuit on which a CPU is mounted, a one-chip microcomputer, or the like. The switch controller 11 outputs to the wireless communicator 10 a channel detection list including the channel numbers of frequency channels as detection targets in accordance with travel information acquired by a travel information acquisition unit 3. The switch controller 11 performs switching control of the frequency channel used by the wireless communicator 10 by using frequency channel information stored in a frequency channel information storage 2.

The switch controller 11 is configured to set a smaller number of channel numbers included in a channel detection list for a higher vehicle travel speed V acquired by the travel information acquisition unit 3.

In the example represented by FIG. 7, it is assumed that the wireless communicator 10, the frequency channel information storage 2, the travel information acquisition unit 3, and the switch controller 11, which are the components of the wireless communication device is composed of dedicated hardware. Alternatively, a part of those components or the whole ones may be composed of a computer.

When the entire wireless communication device is composed of a computer, a program in which the processing content of the wireless communicator 10, the frequency channel information storage 2, the travel information acquisition unit 3, and the switch controller 11 is written may be stored in a memory of the computer, and thus a CPU of the computer may implement the stored program in the memory.

In addition, when a part of the wireless communication device (e.g., the switch controller 11) is composed of a computer, a program in which the process content of the switch controller 11 is written may be stored in a memory of the computer, and a CPU of the computer may implement the stored program in the memory.

Figure 8:
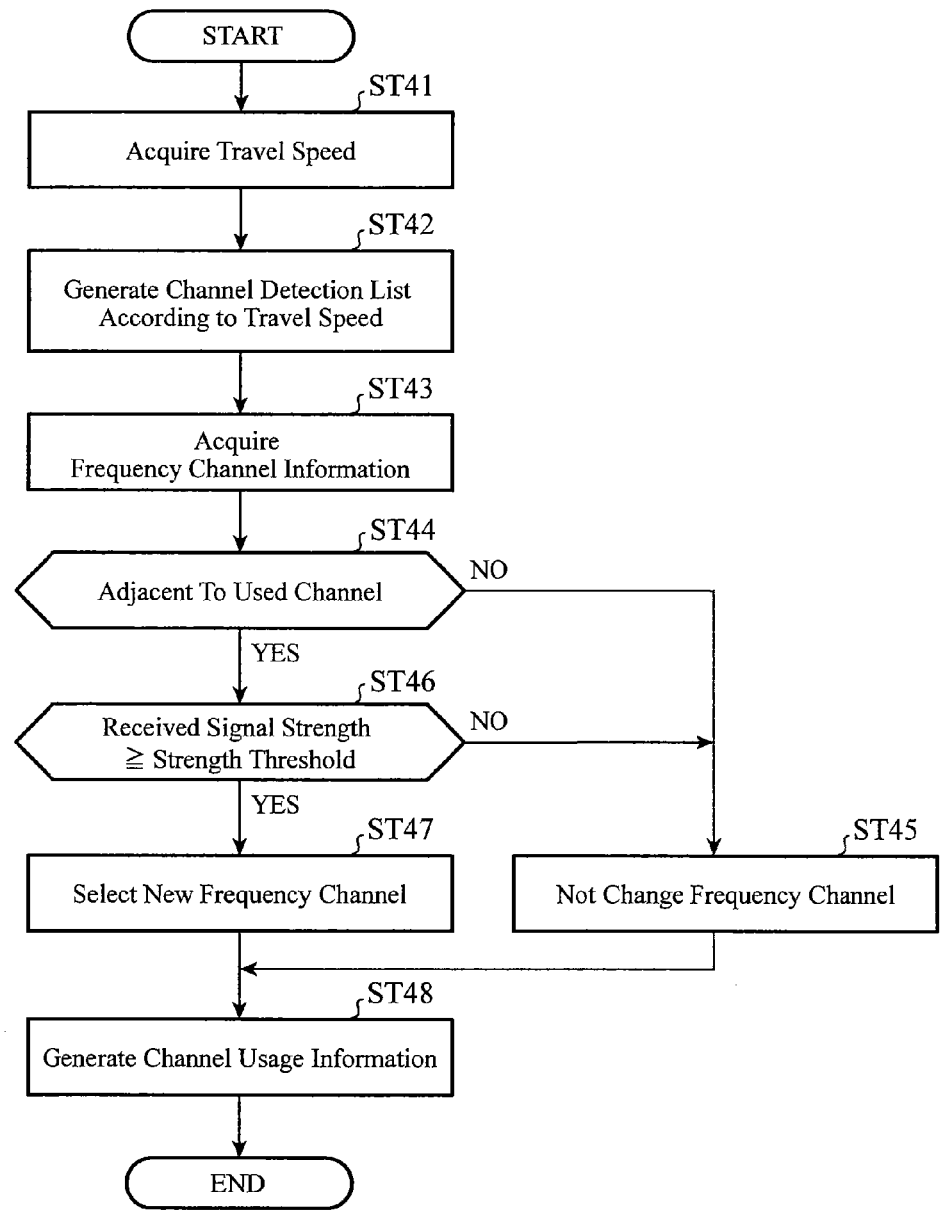
FIG. 8 is a flowchart showing the processing content of a switch controller 11 of the wireless communication device according to Embodiment 4 of the present invention.

FIG. 8 is a flowchart showing the processing content of the switch controller 11 of the wireless communication device according to Embodiment 4 of the present invention.

The operation will be described.

The wireless communicator 10 performs wireless communication with another wireless communication device by using a frequency channel given by the switch controller 11 which will be described later.

In addition, the wireless communicator 10 performs channel scanning in a period during which the wireless communication is not performed in order to detect frequency channels currently used by surrounding wireless communication devices.

Note that the wireless communicator 10 detects only frequency channels with channel numbers included in a channel detection list output from the switch controller 11, which will be described later, instead of all frequency channels currently used by surrounding wireless communication devices.

On detecting a frequency channel currently used by a surrounding wireless communication device, the wireless communicator 10 measures a received signal strength S of the detected frequency channel. The wireless communicator 10 outputs frequency channel information including information on the frequency channel and the received signal strengths S to the frequency channel information storage 2.

The frequency channel information storage 2 stores the frequency channel information output from the wireless communicator 10.

The travel information acquisition unit 3 acquires, for example, a vehicle travel speed V as travel information indicating motion of the vehicle from a speedometer of the vehicle in which the wireless communication device is installed.

The switch controller 11 acquires the vehicle travel speed V from the travel information acquisition unit 3 (step ST41).

After acquiring the vehicle travel speed V, the switch controller 11 creates, according to the travel speed V, a channel detection list including the channel numbers of frequency channels as detection targets, and outputs the channel detection list to the wireless communicator 10 (step ST42).

If the vehicle travel speed V is high, the time required for the vehicle to get away from a location where the communication is interfered is short, and thus the period of time during which the communication is influenced by the interference is short. In this situation, the necessity to change the frequency channel is low. Hence, the switch controller 11 sets a smaller number of channel numbers, included in the channel detection list, for a higher vehicle travel speed V.

When the wireless communicator 10 is not performing wireless communication with other wireless communication devices, the wireless communicator 10 detects frequency channels with channel numbers included in the channel detection list output from the switch controller 11.

The frequency channel information storage 2 stores frequency channel information including information indicating the frequency channels detected by the wireless communicator 10 and received signal strengths S.

The switch controller 11 acquires the frequency channel information stored in the frequency channel information storage 2 (step ST43).

After acquiring the frequency channel information, the switch controller 11 recognizes the frequency channels currently used by the surrounding wireless communication devices by referring to the frequency channel information, and determines whether the frequency channels include the same channel as or an adjacent channel to the frequency channel currently used by the wireless communicator 10 (step ST44).

If the frequency channels currently used by the surrounding wireless communication devices do not include the same or adjacent channel as/to the frequency channel currently used by the wireless communicator 10, the switch controller 11 does not change the frequency channel currently used by the wireless communicator 10 because the communication is not influenced by interference (step ST45).

On the other hand, if the frequency channels currently used by the surrounding wireless communication devices include the same or adjacent channel as/to the frequency channel currently used by the wireless communicator 10, the switch controller 11 recognizes the received signal strengths S of the frequency channels currently used by the surrounding wireless communication devices by referring to the frequency channel information because the communication may be influenced by interference. Then the switch controller 11 determines whether the received signal strengths S of the frequency channels are equal to or more than a predetermined strength threshold $S_{th}$ (step ST46).

If the received signal strengths S of the frequency channels currently used by the surrounding wireless communication devices are less than the strength threshold $S_{th}$, the switch controller 11 does not change the frequency channel currently used by the wireless communicator 10 (step ST45). This is because it is less likely that the communication is influenced by interference (even if the communication is influenced by interference, the influence is considered to be small).

On the other hand, if the received signal strengths S of the frequency channels currently used by the surrounding wireless communication devices are equal to or more than the strength threshold $S_{th}$, the switch controller 11 changes the frequency channel currently used by the wireless communicator 10 because it is highly likely that the communication is influenced by interference.

Specifically, the switch controller 11 selects any one frequency channel from among usable frequency channels other than the frequency channels included in the frequency channel information stored in the frequency channel information storage 2 (step ST47).

When the switch controller 11 changes the frequency channel currently used by the wireless communicator 10 (i.e. when the frequency channels currently used by the surrounding wireless communication devices include the same or adjacent channel as/to the frequency channel currently used by the wireless communicator 10 and the received signal strengths S of the frequency channels currently used by the surrounding wireless communication devices are equal to or more than the strength threshold $S_{th}$), the switch controller 11 outputs channel usage information indicating the newly selected frequency channel to the wireless communicator 10. When the switch controller 11 does not change the frequency channel currently used by the wireless communicator 10, the switch controller 11 outputs channel usage information indicating the same channel as the currently used frequency channel to the wireless communicator 10 (step ST48).

Thereafter, the wireless communicator 10 performs wireless communication with another wireless communication device, using the frequency channel indicated by the channel usage information output from the switch controller 11.

As is clear from the above, according to Embodiment 4, the configuration is such that the switch controller 11 sets a smaller number of channel numbers, included in a channel detection list, for a higher vehicle travel speed V acquired by the travel information acquisition unit 3. Thus, under the circumstances where the necessity to change a frequency channel is low (i.e. where the vehicle travel speed is high), the time required to detect frequency channels is reduced, and thereby the advantage of being able to reduce the time required to switch the frequency channel is achieved. In addition, by the reduction in the time required to detect frequency channels, even under the circumstances where wireless communication is frequently performed, there is an advantage of being able to detect frequency channels during a short period during which wireless communication is not performed.

Furthermore, since frequency channel switching is not performed frequently, the advantage of being able to suppress excessive channel switching is achieved.

Embodiment 4 presents that the frequency channel currently used by the wireless communicator 10 is changed when frequency channels currently used by surrounding wireless communication devices include the same or adjacent channel as/to the frequency channel currently used by the wireless communicator 10 and the received signal strengths S of the frequency channels currently used by the surrounding wireless communication devices are equal to or more than the strength threshold $S_{th}$. Alternatively, as in the above-described Embodiment 1, the frequency channel currently used by the wireless communicator 10 may be changed on a condition that a vehicle travel speed V is less than a speed threshold $V_{th}$.

Embodiment 5

Figure 9:
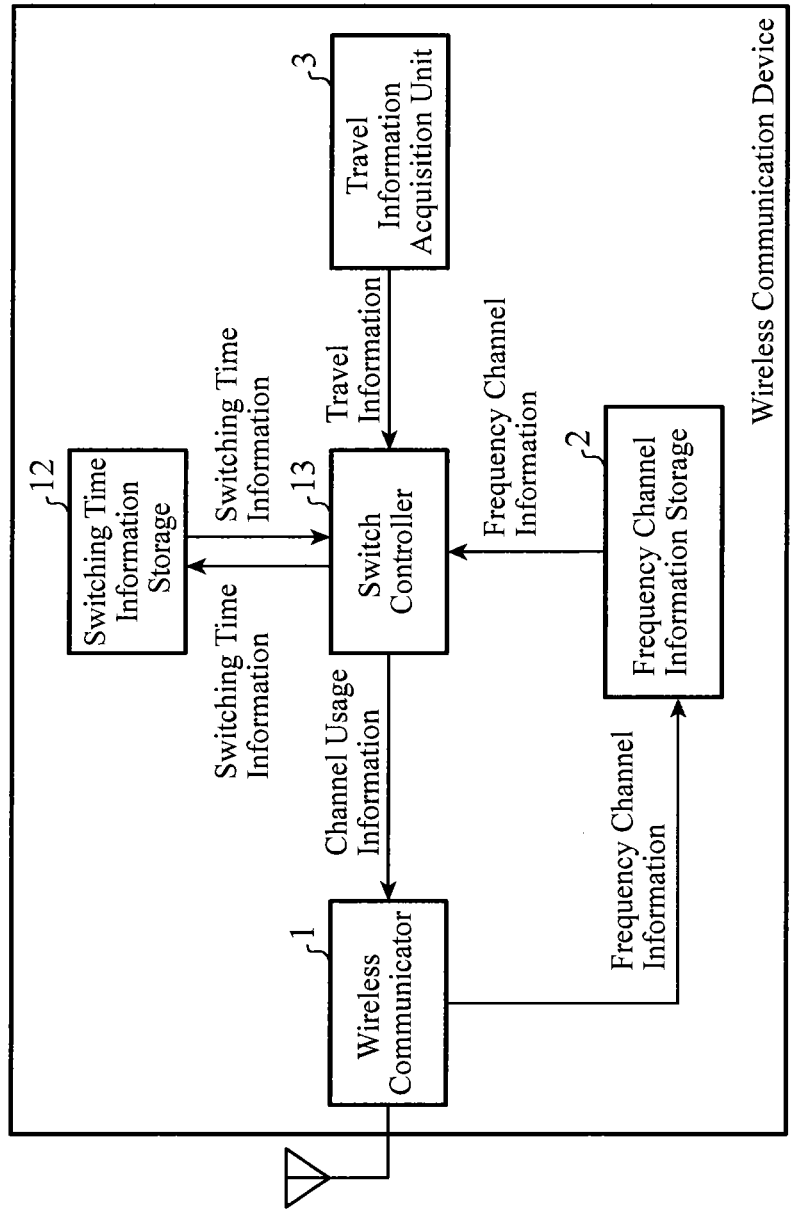
FIG. 9 is a configuration diagram showing a wireless communication device according to Embodiment 5 of the present invention.

FIG. 9 is a configuration diagram showing a wireless communication device according to Embodiment 5 of the present invention. In the drawing, the same reference numerals as those in FIG. 1 indicate the same or corresponding portions and thus description thereof are omitted.

A switching time information storage 12 is composed of, for example, a storage device such as a RAM or a hard disk, and stores switching time information indicating a frequency channel used after switching control by a switch controller 13 and a switching time at which the switching control is performed.

The switch controller 13 is composed of, for example, a semiconductor integrated circuit on which a CPU is mounted, a one-chip microcomputer, or the like. The switch controller 13 performs switching control of the frequency channel used by the wireless communicator 1 in accordance with the frequency channel information stored in the frequency channel information storage 2, the travel information acquired by the travel information acquisition unit 3, and the switching time information stored in the switching time information storage 12.

Specifically, when a vehicle travel speed V acquired by the travel information acquisition unit 3 is equal to or more than a predetermined speed threshold $V_{th}$, the switch controller 13 does not perform the switching control of the frequency channel used by the wireless communicator 1.

On the other hand, if the travel speed V is less than the speed threshold $V_{th}$, the switch controller 13 calculates, by referring to the switching time information stored in the switching time information storage 12, elapsed time T from when the frequency channel is last switched. If the elapsed time T is less than an elapsed time threshold $T_{th}$, the switch controller 13 does not perform switching control of the frequency channel used by the wireless communicator 1. If the elapsed time T is equal to or more than the elapsed time threshold $T_{th}$, the switch controller 13 performs switching control of the frequency channel used by the wireless communicator 1.

In the example represented by FIG. 9, it is assumed that the wireless communicator 1, the frequency channel information storage 2, the travel information acquisition unit 3, the switching time information storage 12, and the switch controller 13, which are the components of the wireless communication device is composed of dedicated hardware. Alternatively, a part of those components or the whole ones may be composed of a computer.

When the entire wireless communication device is composed of a computer, a program in which the processing content of the wireless communicator 1, the frequency channel information storage 2, the switching time information storage 12, the travel information acquisition unit 13, and the switch controller 13 is written may be stored in a memory of the computer, and thus a CPU of the computer may implement the stored program in the memory.

In addition, when a part of the wireless communication device (e.g., the switch controller 13) is composed of a computer, a program in which the process content of the switch controller 13 is written may be stored in a memory of the computer, and a CPU of the computer may implement the stored program in the memory.

Figure 10:
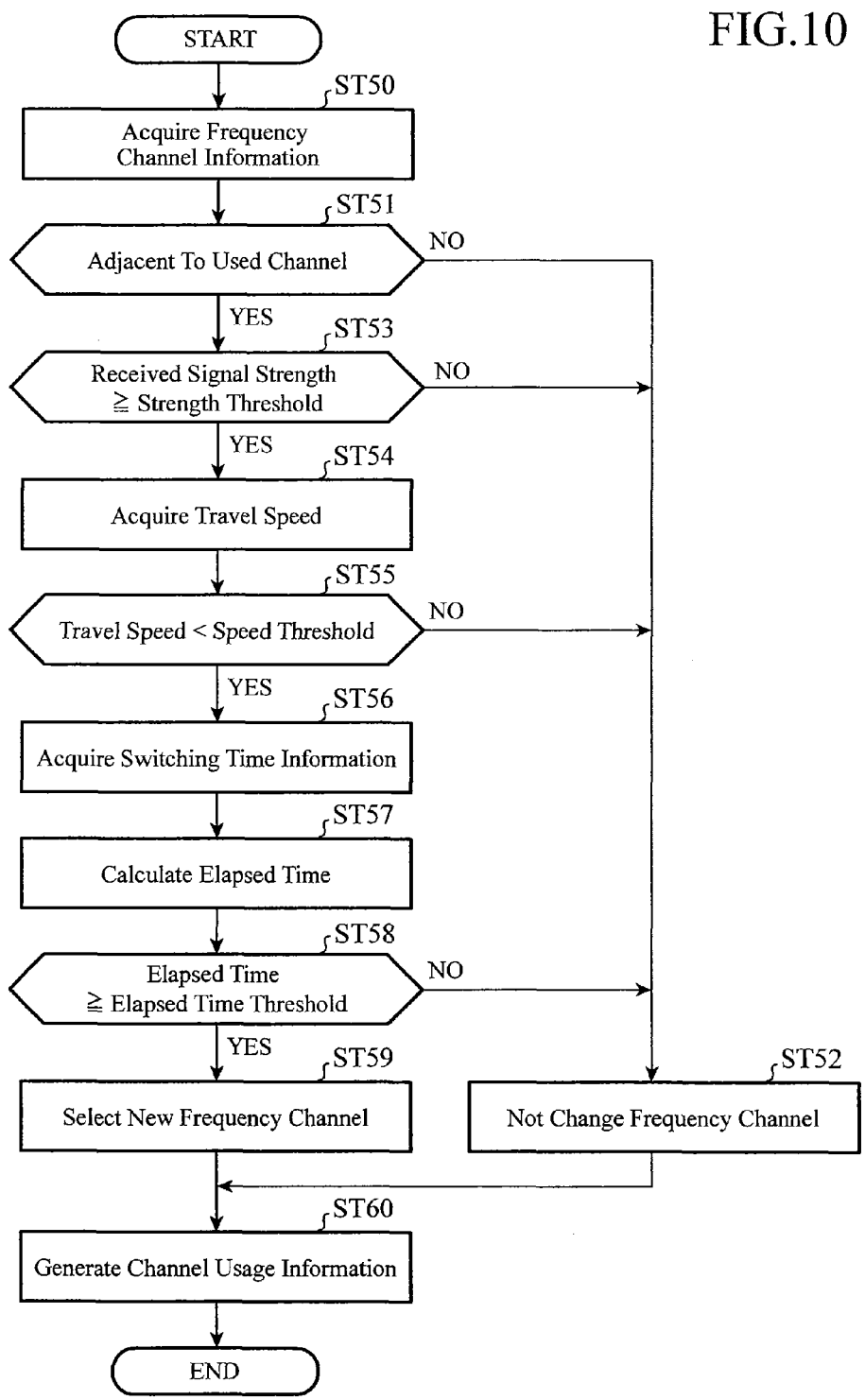
FIG. 10 is a flowchart showing the processing content of a switch controller 13 of the wireless communication device according to Embodiment 5 of the present invention.

FIG. 10 is a flowchart showing the processing content of the switch controller 13 of the wireless communication device according to Embodiment 5 of the present invention.

The operation will be described.

The wireless communicator 1 performs wireless communication with another wireless communication device by using a frequency channel given by the switch controller 13 which will be described later.

In addition, the wireless communicator 1 performs channel scanning in a period during which the wireless communication is not performed in order to detect frequency channels currently used by surrounding wireless communication devices.

On detecting a frequency channel currently used by a surrounding wireless communication device, the wireless communicator 1 measures a received signal strength S of the detected frequency channel. The wireless communicator 1 outputs frequency channel information including information on the frequency channel and the received signal strengths S to the frequency channel information storage 2.

The frequency channel information storage 2 stores the frequency channel information output from the wireless communicator 1.

The switching time information storage 12 stores switching time information indicating a frequency channel used after switching control by the switch controller 13 and a switching time at which the switching control is performed.

Specifically, when the switch controller 13 performs frequency channel switching control and thereby switches a frequency channel indicated by the last switching time information stored to another frequency channel, the switching time information storage 12 stores switching time information indicating the frequency channel used after the switching control and a switching time at which the switching control is performed.

The travel information acquisition unit 3 acquires, for example, a vehicle travel speed V as travel information indicating motion of the vehicle from a speedometer of the vehicle in which the wireless communication device is installed.

The switch controller 13 acquires the frequency channel information stored in the frequency channel information storage 2 (step ST50).

After acquiring the frequency channel information, the switch controller 13 recognizes the frequency channels currently used by the surrounding wireless communication devices by referring to the frequency channel information, and determines whether the frequency channels include the same channel as or an adjacent channel to the frequency channel currently used by the wireless communicator 1 (step ST51).

If the frequency channels currently used by the surrounding wireless communication devices do not include the same or adjacent channel as/to the frequency channel currently used by the wireless communicator 1, the switch controller 13 does not change the frequency channel currently used by the wireless communicator 1 because the communication is not influenced by interference (step ST52).

On the other hand, if the frequency channels currently used by the surrounding wireless communication devices include the same or adjacent channel as/to the frequency channel currently used by the wireless communicator 1, the switch controller 13 recognizes the received signal strengths S of the frequency channels currently used by the surrounding wireless communication devices by referring to the frequency channel information because the communication may be influenced by interference. Then the switch controller 13 determines whether the received signal strengths S of the frequency channels are equal to or more than a predetermined strength threshold $S_{th}$ (step ST53).

If the received signal strengths S of the frequency channels currently used by the surrounding wireless communication devices are less than the strength threshold $S_{th}$, the switch controller 13 does not change the frequency channel currently used by the wireless communicator 1 (step ST52). This is because it is less likely that the communication is influenced by interference (even if the communication is influenced by interference, the influence is considered to be small).

On the other hand, if the received signal strengths S of the frequency channels currently used by the surrounding wireless communication devices are equal to or more than the strength threshold $S_{th}$, the switch controller 13 acquires the vehicle travel speed V from the travel information acquisition unit 3 (step ST54). This is because it is highly likely that the communication is influenced by interference.

After acquiring the vehicle travel speed V from the travel information acquisition unit 3, the switch controller 13 determines whether the vehicle travel speed V is equal to or more than a predetermined speed threshold $V_{th}$, (step ST55).

If the vehicle travel speed V is equal to or more than the predetermined speed threshold $V_{th}$, the switch controller 13 does not change the frequency channel currently used by the wireless communicator 1 (step ST52). This is because it is considered that the time required for the vehicle to get away from a location where the communication is interfered is short, and thus the period of time during which the communication is influenced by the interference is short.

If the vehicle travel speed V is less than the predetermined speed threshold $V_{th}$, the switch controller 13 acquires the switching time information from the switching time information storage 12 (step ST56), and calculates elapsed time T from when the frequency channel is last switched, by referring to the switching time information (step ST57).

After calculating the elapsed time T from when the frequency channel is last switched, the switch controller 13 determines whether the elapsed time T is equal to or more than a predetermined elapsed time threshold $T_{th}$ (step ST58).

If the elapsed time T from when the frequency channel is last switched is less than the elapsed time threshold $T_{th}$, the switch controller 13 does not change the frequency channel currently used by the wireless communicator 1 (step ST52). This is because it is considered that the temporary influence of interference by other vehicles traveling at a higher speed than that of the vehicle, etc., is occurring. By this control, frequent frequency channel switching can be avoided.

On the other hand, if the elapsed time T is equal to or more than the elapsed time threshold $T_{th}$, the switch controller 13 changes the frequency channel currently used by the wireless communicator 1. This is because it is considered that a communication environment by the influence of interference from a fixed access point, etc., has changed with the motion of the vehicle.

Specifically, the switch controller 13 selects any one frequency channel from among usable frequency channels other than the frequency channels included in the frequency channel information stored in the frequency channel information storage 2 (step ST59).

When the switch controller 13 changes the frequency channel currently used by the wireless communicator 1 (i.e. when the frequency channels currently used by the surrounding wireless communication devices include the same or adjacent channel as/to the frequency channel currently used by the wireless communicator 1, the received signal strengths S of the frequency channels currently used by the surrounding wireless communication devices are equal to or more than the strength threshold $S_{th}$, the vehicle travel speed V is less than the speed threshold value $V_{th}$, and the elapsed time T from the last switching time is equal to or more than the elapsed time threshold $T_{th}$), the switch controller 13 outputs channel usage information indicating the newly selected frequency channel to the wireless communicator 1.

When the switch controller 13 does not change the frequency channel currently used by the wireless communicator 1, the switch controller 6 outputs channel usage information indicating the same channel as the currently used frequency channel to the wireless communicator 1 (step ST60).

Thereafter, the wireless communicator 1 performs wireless communication with another wireless communication device, using the frequency channel indicated by the channel usage information output from the switch controller 13.

As is clear from the above, according to Embodiment 5, the configuration is such that even when the vehicle travel speed V of the vehicle is less than the speed threshold $V_{th}$, if the elapsed time T from the last frequency channel switching time is less than the elapsed time threshold $T_{th}$, the frequency channel used by the wireless communicator 1 is not switched. Thus, there is an advantage of being able to prevent the occurrence of a situation where the frequency channel is frequently switched due to the temporary influence of interference by other vehicles traveling at a higher speed than that of the vehicle, etc.

Note that the invention of the present application allows free combinations of Embodiments, or modifications to any component in Embodiments, or omission of any component in Embodiments within the scope of the present invention.

INDUSTRIAL APPLICABILITY

The wireless communication device according to the invention is suitable for use as a device that selects an arbitrary frequency channel from among a plurality of frequency channels and performs wireless communication with another wireless communication device installed in another vehicle, using the frequency channel.

The invention claimed is:

1. A wireless communication device that is installed in a moving object and that performs wireless communication by using a frequency channel selected from among a plurality of frequency channels, the wireless communication device comprising:
　a wireless communicator that detects a frequency channel currently used by another wireless communication device presenting around the moving object and measures a signal strength of the detected frequency channel;
　a frequency channel information storage that stores frequency channel information indicating the detected frequency channel and the measured signal strength;
　a travel information acquisition unit that acquires a travel speed of the moving object as travel information indicating motion of the moving object; and
　a switch controller that determines whether to change the frequency channel used by the wireless communicator on a basis of the frequency channel information and the travel information and that performs switching control of the frequency channel of the wireless communicator in accordance with a result of the determination, the switch controller deciding not to change the frequency channel used by the wireless communicator when the signal strength indicated by the frequency channel information is less than a prescribed threshold,
　wherein the switch controller
　　decides not to change the frequency channel used by the wireless communicator in a case where the acquired travel speed is equal to or more than a predetermined speed threshold, and
　　decides to change the frequency channel used by the wireless communicator in a case where the acquired travel speed is less than the predetermined speed threshold while the signal strength indicated by the frequency channel information is equal to or more than the prescribed threshold.

2. The wireless communication device according to claim 1, wherein
the frequency channel information storage records a number of detection of the frequency channel performed by the wireless communicator, and
in a case where the switch controller changes the frequency channel used by the wireless communicator, the switch controller
sets a higher interference detection threshold for a higher travel speed of the moving object acquired by the travel information acquisition unit,
excludes, from selection, a frequency channel whose number of detection recorded in the frequency channel information storage exceeds the interference detection threshold, and
selects a frequency channel to be used by the wireless communicator from among frequency channels other than the excluded frequency channel.

3. The wireless communication device according to claim 1, wherein
the wireless communicator performs the detection of the frequency channel when a channel detection request is received, and
the switch controller outputs the channel detection request to the wireless communicator depending on the travel information acquired by the travel information acquisition unit.

4. The wireless communication device according to claim 3, wherein
the travel information acquisition unit acquires, as the travel information, any one of information indicating a travel speed of the moving object, information indicating a location of the moving object, information indicating acceleration/deceleration movement of the moving object, and information indicating a steering wheel operation on the moving object, and
the switch controller
determines whether surrounding condition of the moving object has changed by using the travel information, and
when the switch controller determines that the surrounding condition has changed, outputs the channel detection request to the wireless.

5. The wireless communication device according to claim 1, further comprising a switching time information storage that stores switching time information indicating a switching time at which the switching control of the frequency channel is performed by the switch controller,
wherein the switch controller performs the switching control in accordance with the frequency channel information stored in the frequency channel information storage, the travel information acquired by the travel information acquisition unit, and the switching time information stored in the switching time information storage.

6. The wireless communication device according to claim 5, wherein
the switch controller
decides not to change the frequency channel used by the wireless communicator in a case where the acquired travel speed is equal to or more than a predetermined speed threshold,
calculates elapsed time from when the frequency channel is last switched by referring to the switching time information stored in the switching time information storage in a case where the acquired travel speed is less than the predetermined speed threshold, and
decides not to change the frequency channel used by the wireless communicator in a case where the elapsed time is less than a predetermined elapsed time threshold and decides to change the frequency channel used by the wireless communicator in a case where the elapsed time is equal to or more than the predetermined elapsed time threshold.

7. The wireless communication device according to claim 1, wherein the wireless communicator performs the detection of the frequency channel in a period during which the wireless communication device does not perform wireless communication with another wireless communication device.

8. A wireless communication device that is installed in a moving object and that performs wireless communication by using a frequency channel selected from among a plurality of frequency channels, the wireless communication device comprising:
a wireless communicator that detects a frequency channel of a channel number included in a channel detection list and measures a signal strength of the detected frequency channel;
a frequency channel information storage that stores frequency channel information indicating the detected frequency channel and the measured signal strength;
a travel information acquisition unit that acquires a travel speed of the moving object as travel information indicating motion of the moving object; and
a switch controller that
outputs, to the wireless communicator, a channel detection list including a channel number of a frequency channel as a detection target depending on the travel information, and
determines whether to change the frequency channel used by the wireless communicator on a basis of the frequency channel information and performs switching control of the frequency channel of the wireless communicator in accordance with a result of the determination, the switch controller deciding not to change the frequency channel used by the wireless communicator when the signal strength indicated by the frequency channel information is less than a prescribed threshold,
wherein the switch controller reduces quantity of the channel number to be included in the channel detection list as the travel speed indicates higher value.

9. The wireless communication device according to claim 8, wherein the wireless communicator performs the detection of the frequency channel in a period during which the wireless communication device does not perform wireless communication with another wireless communication device.

10. A frequency channel selecting method for a wireless communication device that is installed in a moving object, the method comprising:
detecting a frequency channel currently used by another wireless communication device presenting around the moving object and measures a signal strength of the detected frequency channel;
storing frequency channel information indicating the detected frequency channel and the measured signal strength;
acquiring a travel speed of the moving object as travel information indicating motion of the moving object; and
determining whether to change the frequency channel used by the wireless communication device on a basis of the frequency channel information and the travel information and performing switching control of the frequency channel of the wireless communication device in accordance with a result of the determination, wherein the step of determining is performed to decide not to change the frequency channel used by the wireless communication device when the signal strength indicated by the frequency channel information is less than a prescribed threshold, decide not to change the frequency channel used by the wireless communicator in a case where the acquired travel speed is equal to or more than a predetermined speed threshold, and decide to change the frequency channel used by the wireless communicator in a case where the acquired travel speed is less than the predetermined speed threshold while the signal strength indicated by the frequency channel information is equal to or more than the prescribed threshold.

11. The frequency channel selecting method, according to claim 10, wherein the method further comprising:

recording a number of detection of the frequency channel performed by the wireless communication device; and in a case where the frequency channel used by the wireless communication device is changed, setting a higher interference detection threshold for a higher travel speed of the moving object, excluding, from selection, a frequency channel whose recorded number of the detection exceeds the interference detection threshold, and selecting a frequency channel to be used by the wireless communication device from among frequency channels other than the excluded frequency channel.

12. The frequency channel selecting method, according to claim 10, wherein the detecting is performed when a channel detection request is received, and the channel detection request is issued depending on the acquired travel information.

13. The frequency channel selecting method, according to claim 10, wherein the acquired travel information is any one of information indicating a travel speed of the moving object, information indicating a location of the moving object, information indicating acceleration/deceleration movement of the moving object, and information indicating a steering wheel operation on the moving object, the detecting includes determining by using the travel information whether surrounding condition of the moving object has changed, and the channel detection request is issued when it is determined that the surrounding condition has changed.

* * * * *